(12) United States Patent
Krasner et al.

(10) Patent No.: US 7,570,958 B2
(45) Date of Patent: Aug. 4, 2009

(54) METHODS AND APPARATUSES FOR CONTROLLING DISTRIBUTION OF LOCATION INFORMATION

(75) Inventors: Norman F. Krasner, San Carlos, CA (US); Leonid Sheynblat, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/961,986

(22) Filed: Oct. 7, 2004

(65) Prior Publication Data

US 2005/0070305 A1  Mar. 31, 2005

Related U.S. Application Data

(63) Continuation of application No. 09/975,037, filed on Oct. 10, 2001, now abandoned.

(51) Int. Cl.
*H04M 3/42* (2006.01)

(52) U.S. Cl. .................... 455/456.1; 455/456.6

(58) Field of Classification Search .............. 455/404.2, 455/456.1, 456.3, 456.5, 456.6, 411, 406; 342/450, 357.01, 357.06, 357.07, 357.09

See application file for complete search history.

(56) References Cited

U.S. PATENT DOCUMENTS 5,731,785 A * 3/1998 Lemelson et al. ...... 342/357.07
6,138,003 A  10/2000 Kingdon et al.
6,360,102 B1 * 3/2002 Havinis et al. .............. 455/457

(Continued)

FOREIGN PATENT DOCUMENTS

JP  11-272698  10/1999

(Continued)

OTHER PUBLICATIONS

"Universal Mobile Telecommunications System (UMTS); Functional Stage 2 Description of Location Services," version 4.1.0 Release 4. ETSI TS 123 271, 2001, pp. 1-70.

(Continued)

*Primary Examiner*—Sam Bhattacharya
(74) *Attorney, Agent, or Firm*—Donald C. Kordich; Linda G. Gunderson

(57) ABSTRACT

A mobile system, such as a wireless phone, communicates its location or other position information, such as pseudoranges, to a server system and optionally sends permission criteria defining which other mobile systems are allowed to access its location. In the case where the mobile system does not provide its location, the server determines the location using the other position information provided (e.g. pseudoranges for satellites in view of the mobile system). The server system sends the location to other mobile systems in accordance with the permission criteria, with or without a request from another mobile system for the location. If no permission criteria has been sent by the mobile system, the server system queries the mobile system for the permission criteria in response to a request for the location. If no permission criteria is sent by the mobile system, or if the permission criteria sent denies the request, the server system can, alternately, not reply to the request or reply with an error message. The permission criteria can include additional access limitations such as dates or times during which access is permitted or denied, and geographic areas in which access is permitted or denied.

29 Claims, 9 Drawing Sheets

U.S. PATENT DOCUMENTS

| | | | |
|---|---|---|---|
| 6,377,810 B1 * | 4/2002 | Geiger et al. | 455/456.2 |
| 6,463,288 B1 * | 10/2002 | Havinis et al. | 455/456.1 |
| 6,662,014 B1 * | 12/2003 | Walsh | 455/456.2 |
| 2001/0003093 A1 | 6/2001 | Lundin | |
| 2001/0018339 A1 * | 8/2001 | Murakami | 455/411 |
| 2002/0045455 A1 * | 4/2002 | Spratt | 455/456 |
| 2002/0173317 A1 * | 11/2002 | Nykanen et al. | 455/456 |
| 2003/0008662 A1 * | 1/2003 | Stern et al. | 455/456 |
| 2006/0046744 A1 * | 3/2006 | Dublish et al. | 455/456.3 |

FOREIGN PATENT DOCUMENTS

| | | |
|---|---|---|
| JP | 2000-106688 | 4/2000 |
| WO | WO-9852379 | * 11/1998 |
| WO | 9927746 | 6/1999 |

OTHER PUBLICATIONS

International Search Report—PCT/US02/032561, International Search Authority—European Patent Office, Apr. 23, 2003.

Written Opinion - PCT/US02/032561, IPEA - US, May 27, 2008.

* cited by examiner

METHODS AND APPARATUSES FOR CONTROLLING DISTRIBUTION OF LOCATION INFORMATION

RELATED APPLICATIONS

This application is a continuation of U.S. patent application Ser. No. 09/975,037, filed on Oct. 10, 2001, now abandoned.

FIELD OF THE INVENTION

This invention relates generally to satellite positioning systems, and more particularly to locating a receiver for a satellite positioning system.

BACKGROUND OF THE INVENTION

Satellite positioning systems (SPS), such as the Global Positioning System (GPS), permit the determination of a geographic location of an entity, such as a person, that is equipped with an SPS receiver. SPS receivers, such as those which operate in GPS or other satellite positioning systems, normally determine their position by computing relative times of arrival of signals transmitted simultaneously from a multiplicity of satellites, such as GPS, NAVSTAR, or other satellites.

These satellites typically transmit, as part of their satellite data message, timing and satellite positioning data, which is sometimes referred to as "ephemeris" data. The term "ephemeris" or "satellite ephemeris" is generally used to mean a representation, such as an equation, which specifies the positions of satellites (or a satellite) over a period of time or time of day. In addition, the satellites can transmit data to indicate a reference time, such as time-of-week (TOW) information, that allows a receiver to determine unambiguously local time.

Typically, an SPS receiver computes one or more "pseudorange" measurements, each of which represents the range between the receiver and a satellite vehicle (SV). The term "pseudorange" is generally used to point out that the range measurement may include error due to one or more factors, including, for example, the error between time as indicated by the clock of the SPS receiver and a reference time, such as the reference time associated with the more accurate atomic clock of the satellites. Thus, the SPS receiver typically uses the pseudoranges, along with timing and ephemeris data provided in the satellite signal to determine a more accurate set of navigational data, such as position, time, and/or range.

Alternatively, the SPS receiver may not determine its location directly, but rather uploads information regarding its position, such as pseudoranges, to a server computer. The server computer computes the geographical location for the receiver from the pseudoranges. While an SPS receiver can determine its position or cause a server system to do so, it is also desirable to make the location known to other SPS receivers or other types of receivers under controlled circumstances.

SUMMARY OF THE INVENTION

The above-mentioned shortcomings, disadvantages and problems are addressed by the present invention, which will be understood by reading and studying the following specification.

A mobile communications system, acting as an SPS receiver, communicates information about its location to a server system and optionally sends permission criteria defining which other mobile systems are allowed to access its location. The server derives the location from the position information provided (or receives the location calculated by the SPS receiver) and sends the location to other mobile systems in accordance with the permission criteria. In one aspect of the invention, the location is sent only in response to a request from another mobile system for the location; in another aspect, it is sent automatically. If no permission criteria has been sent by the mobile system, the server system queries the mobile system for the permission criteria in response to a request for the location. If no permission criteria is sent in response to the query, or if the permission criteria sent denies the request, the server system can, alternately, not reply to the request or reply with an error message. The permission criteria can include additional location access constraints such as dates or times during which access is permitted or denied, and geographic areas in which access is permitted or denied. Similar constraints can also be specified by mobile system sending the location request.

The location service provided by the present invention allows one person to locate another, but only with the permission of the other person. The location service also enables the use of a mobile system capable of only one-way communication to track items, such as delivery trucks or other vehicles.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings in which like references indicate similar elements, and in which is shown by way of illustration specific exemplary embodiments in which the invention can be practiced. These embodiments are described in sufficient detail to enable those skilled in the art to practice the invention, and it is to be understood that other embodiments can be utilized and that logical, mechanical, electrical and other changes can be made without departing from the scope of the present invention. The following detailed description is, therefore, not to be taken in a limiting sense, and the scope of the present invention is defined only by the appended claims.

The detailed description is divided into four sections. In the first section, the operating environment in conjunction with which embodiments of the invention can be practiced is described. In the second section, a system level overview of the invention is presented. In the third section, methods for an exemplary embodiment of the invention are provided. Finally, in the fourth section, a conclusion of the detailed description is provided.

Operating Environment

The following description of FIGS. 1A, 1B, 1C and 1D is intended to provide an overview of a satellite positioning system (SPS) environment in which exemplary embodiments of the invention can be practiced, but is not intended to limit the applicable environments. SPS mobile receivers ("mobiles") can communicate with the resources of a remote site, or "cell," utilizing a wireless communications system, such as a cellular telephone system. A cell includes a wireless cell based station ("cell basestation") which may be used to supplement SPS signal processing in the mobile. The system also can be configured with servers having computers that provide assistance data to the SPS mobiles to enhance their performance, receive data from the SPS mobiles, and perform further processing on such data to complete or refine a position calculation, etc.

Figure 1A:
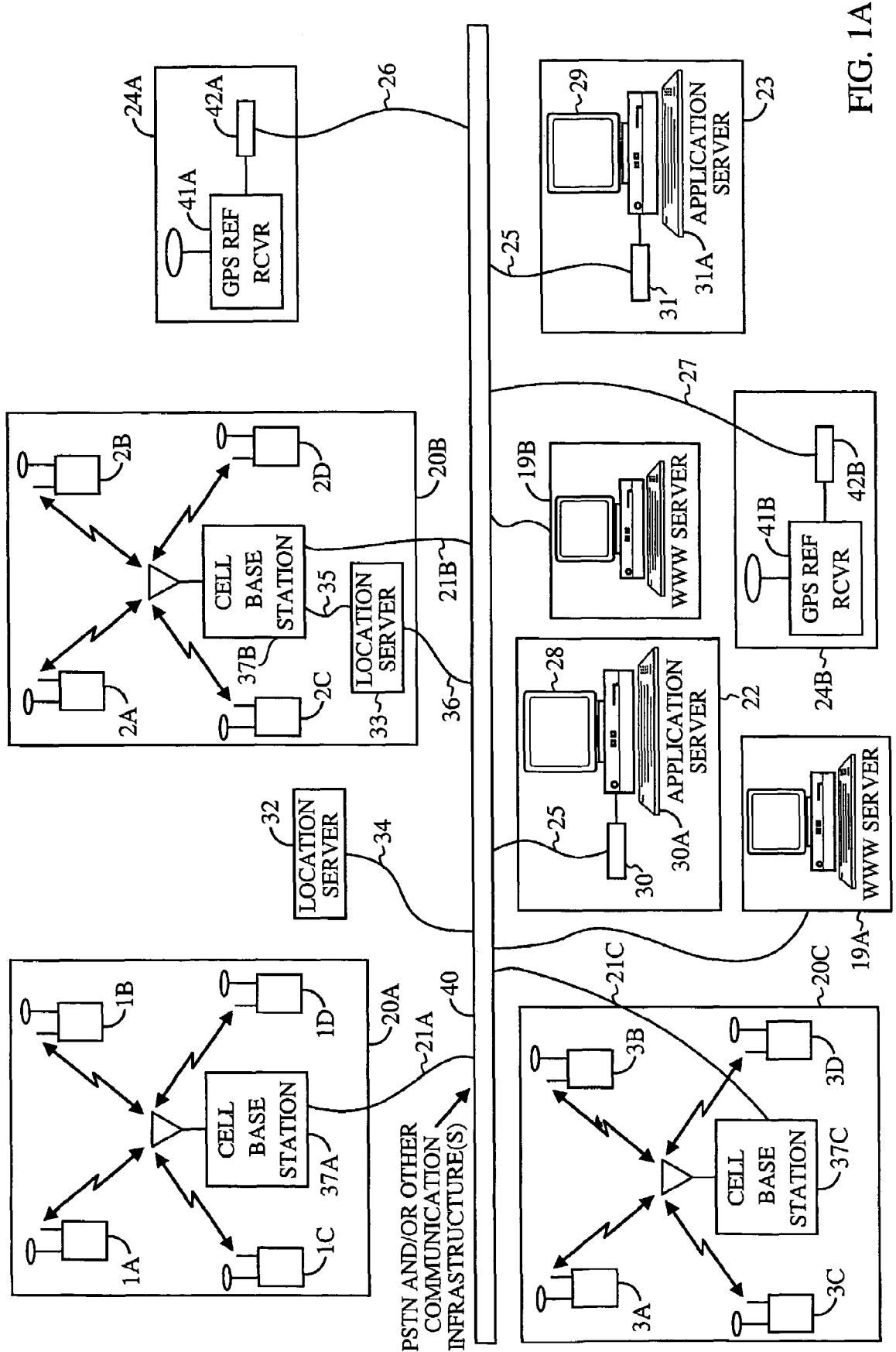
FIG. 1A is a block diagram of one embodiment of a satellite positioning system environment suitable for practicing the present invention.

FIG. 1A illustrates an exemplary embodiment of a distributed satellite positioning system with SPS mobiles 1A-D, 2A-D, 3A-D and cells 20a-c, each of which includes its respective wireless basestation. Cell basestation 37a performs wireless communications to and from SPS mobiles 1a, 1b, 1c, and 1d, each of which includes a wireless communication system, in the cell 20a. Similarly, cell basestation 37b in cell 20b provides 2-way wireless communications with SPS mobiles 2a, 2b, 2c, and 2d, each of which includes a wireless communication system such as a cell telephone. The cell 20c includes SPS mobiles 3a, 3b, 3c, and 3d which are capable of performing 2-way wireless communications with the cell basestation 37c. It will be understood that in certain embodiments of the invention, some SPS mobiles may be capable of only 1-way communications (transmissions to the basestation) wherein the mobile SPS unit determines its position (by determining pseudoranges and reading transmissions of satellite ephemeris data) and transmits the position to an application server (or these mobile SPS units may transmit pseudoranges to a location server which then computes the mobile's position). Each cell basestation includes a respective connection (e.g. connections 21a, 21b, or 21c) from the basestation to a communication infrastructure 40. A typical embodiment for a cell is described below in conjunction with FIG. 1B. FIG. 1C illustrates an exemplary embodiment of a mobile SPS receiver that is configured for a GPS satellite system.

The network of FIG. 1A also contains the following constituent elements:

A. Location servers (e.g. servers 32 or 33) that communicate with the mobile GPS units via the public switched communication network (PSTN) or other communications infrastructure (e.g. leased lines, satellites, etc.), which in turn communicate with the wireless basestations (e.g. station 37a). FIG. 1D is a block diagram of an exemplary embodiment of a location server suitable for operation within the network of FIG. 1A.

B. Separate application servers (e.g. servers 22 or 23) that can display the results of location information supplied by the location servers and permit auxiliary services, such as dispatching, to be performed.

C. WWW servers (e.g., WWW servers 19a or 19b) that can provide location-based information (i.e., information related to a client's location or another location, which, for example, may be of interest to the client) to a client connected to the WWW server through the network, such as a mobile GPS unit (e.g., unit 1a), or directly to the WWW server through an Internet Service Provider (ISP) (not shown)

D. A communication infrastructure 40 that can include a public switched telephone network and/or a dedicated network, such as a packet switched data network.

E. Separate GPS reference receivers (e.g. GPS reference stations 24a or 24b), that measure ranging information from the GPS satellites over a wide geographical area, and receive and process their navigation message data (e.g. to provide differential GPS information for use by the location servers and/or the mobile SPS units).

In general, all of these network elements communicate with one another as seen in the embodiment illustrated in FIG. 1A. In an alternate embodiment, the GPS reference receivers communicate with the location servers, and the location servers communicate mainly with the application servers and with the WWW servers. In another embodiment, the WWW server can act as a proxy server for an application server. In such capacity, the WWW server acts as an entry point for information to be relayed to and from the application server. All servers are assumed to be computer-based, that is, each server executes computer software on a processor that is coupled to a memory through a system bus, which is further coupled to the network. The basics of computer-based servers are well known in the art and are not illustrated or discussed further.

Figure 1B:
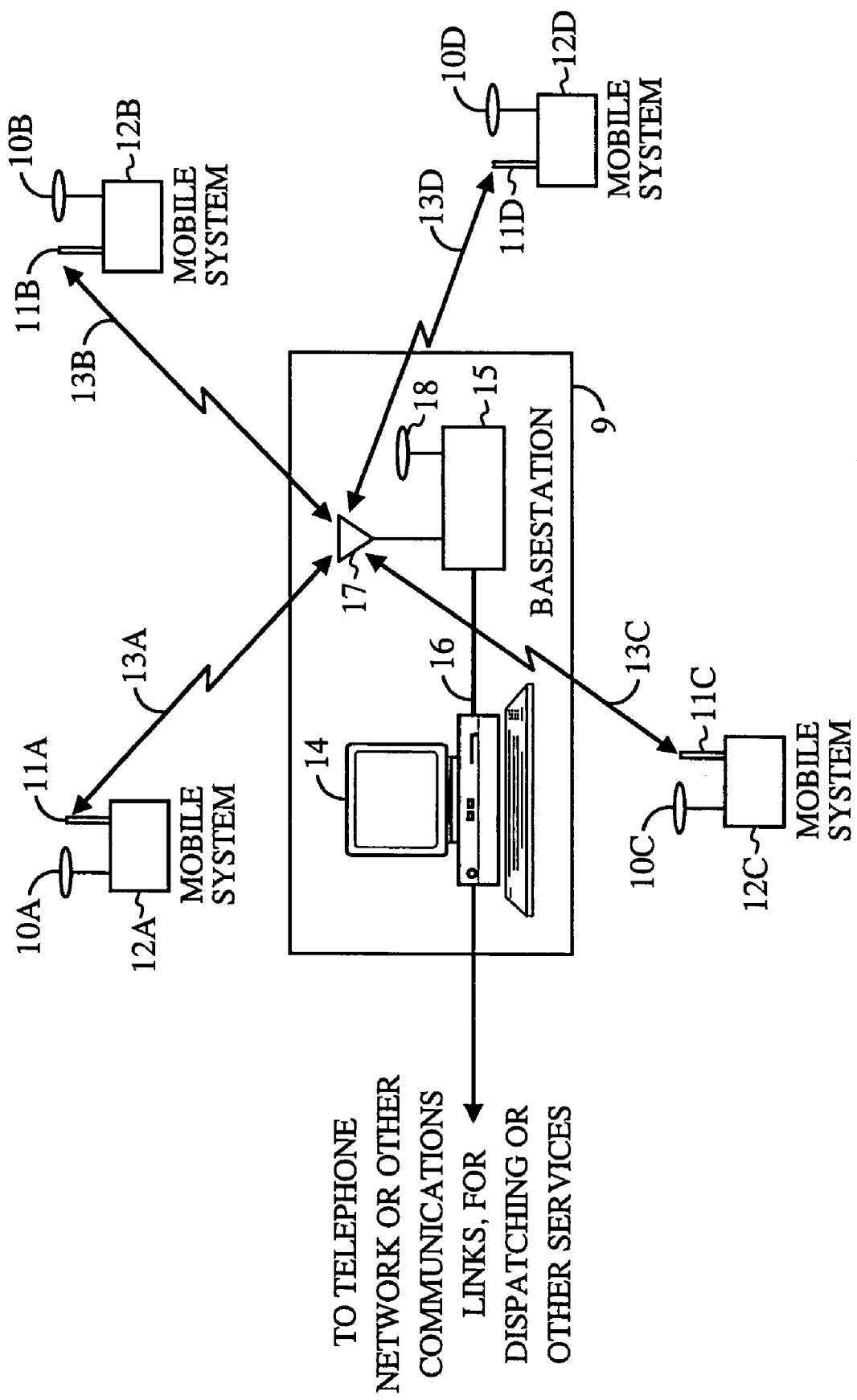
FIGS. 1B, 1C and 1D are a block diagrams of individual components that comprise the system of FIG. 1A.
Figure 1C:
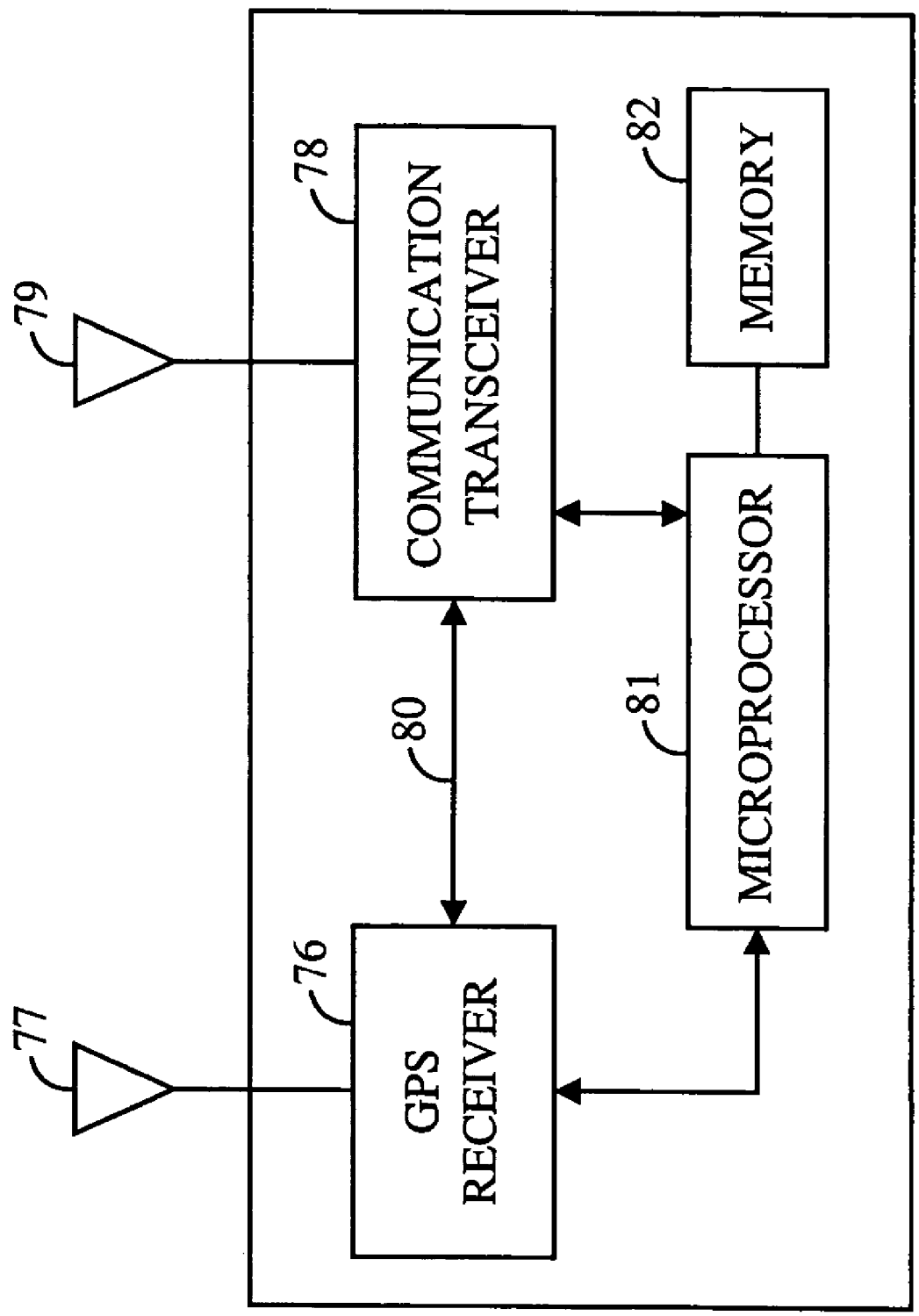
Figure 1D:
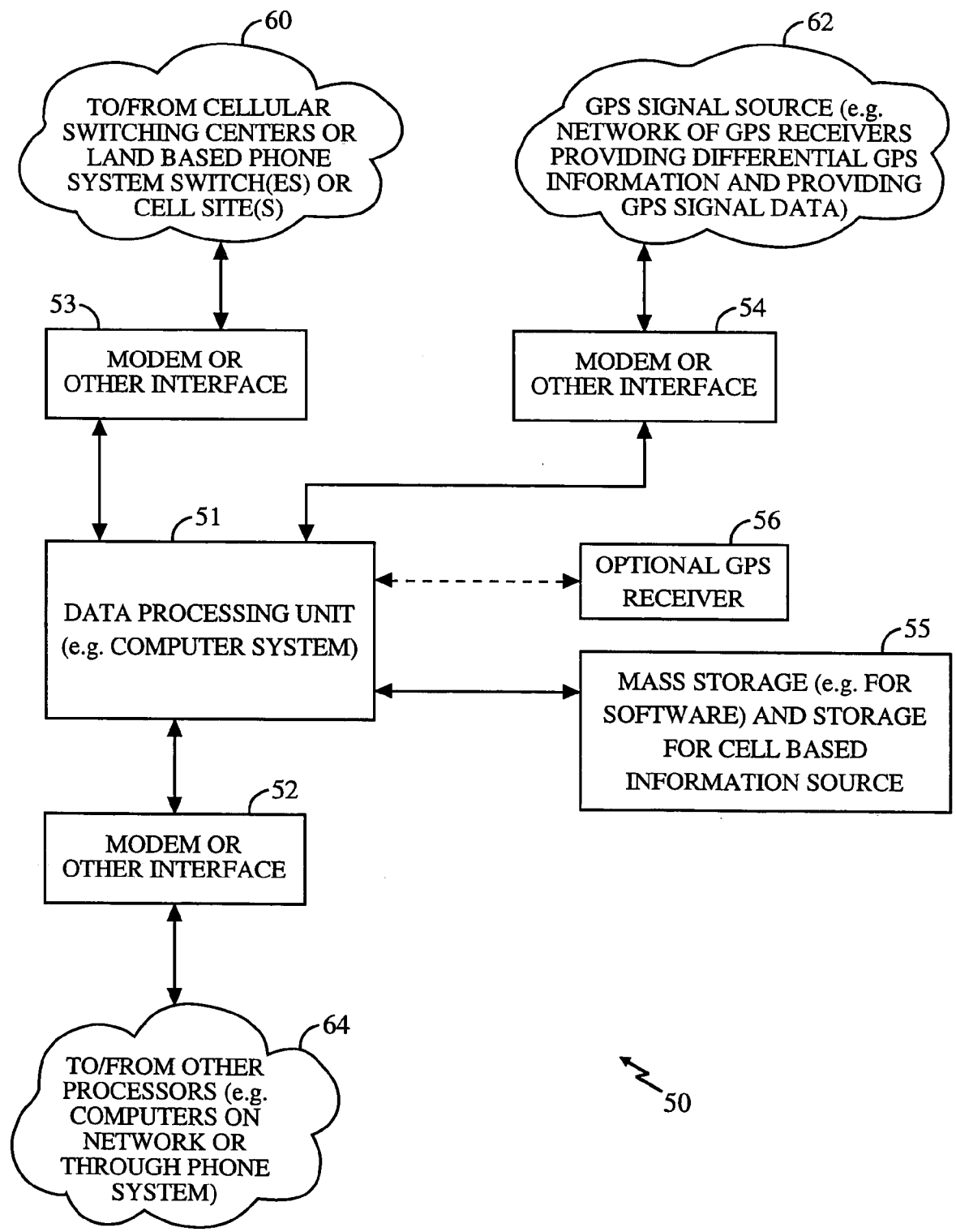

In the cell shown in FIG. 1B, the mobile units 12a, 12b, 12c, and 12d contain a combination of a GPS receiver and a wireless modem. Attached to the GPS unit are GPS antennas 10a, 10b, 10c, and 10d for receiving GPS signals from GPS satellites (not shown for simplicity) and antennas 11a, 11b, 11c, and 11d for communication to and from a basestation 9 which includes a basestation antenna 17. In some implementations, this communication can be in one direction only.

Basestation 9 contains a signal processing unit 15 which may provide aid to the mobile GPS units to help the GPS units obtain positioning information and/or the signal processing unit 15 may complete or refine the position calculations of these mobile GPS units based upon data transmitted to the signal processing unit 15 from these mobile GPS units, together with auxiliary data which the signal processing unit 15 may gather with its own GPS antenna 18. The signal processing unit 15 can contain its own GPS receiver and GPS antenna in order to receive satellite ephemeris data when the unit 15 provides aid or completes the position calculation and provides differential corrections to the data transmitted to the unit 15 from the mobile GPS units. Basestation 9 can also include a display 14 and computer equipment which is coupled to the signal processing unit 15 by a connection 16 and which allows an operator to visually track the position of the mobile GPS units and to provide manual and semiautomatic commands to these mobile GPS units via the aforementioned communications links. In some cases, display 14 together with signal processing unit 15 is termed a "workstation."

Although FIG. 1B shows a wireless link from each mobile GPS unit to the basestation, this link can actually be a wireless link to a modem, such as one at a cell site, followed by a wired or other link to the basestation. In some implementations, the basestation 9 may actually represent a number of basestations in a reference network, as described further below.

Turning now to FIG. 1C, a generalized combined mobile system 75 that includes a GPS receiver 76 and a communication transceiver 78 is described. Instructions executed from a memory 82 by the microprocessor 81 control the functions of the mobile system 75. As previously described, the communication transceiver 78 can be a cellular telephone or a modem or other type of communication apparatus. The communication transceiver 78 has a communication antenna 79. The GPS receiver 76 is coupled to the communication transceiver 78 through a connection 80. In one mode of operation, the communication transceiver 78 receives approximate Doppler information through the antenna 79 and provides this approximate Doppler information over the connection 80 to the GPS receiver 76 which performs the pseudorange determination by receiving the GPS signals from the GPS satellites through the GPS antenna 77. The determined pseudoranges are then transmitted to a GPS location server through the communication transceiver 78. Typically, the communication transceiver 78 sends a signal through the antenna 79 to a cell base station. The base station then transfers this information back to a GPS location server. The mobile system 75 of FIG. 1C, as well as numerous alternative mobile SPS communication systems known in the art, can be employed with the presently disclosed methods operate with the computer network illustrated in FIG. 1A.

Although each mobile 1, 2, 3 is shown in FIG. 1A as communicating with one wireless basestation, it should be appreciated that in many mobile telephone situations, for example, a mobile can in fact communicate with a multiplicity of cell basestations.

Lastly, FIG. 1D shows one embodiment of a GPS location server 50 that can be used as the location server 32, 33 in FIG. 1A. The GPS server 50 of FIG. 1C includes a data processing unit 51, such as a fault-tolerant digital computer system. The GPS server 50 also includes several modems or other communication interfaces 52, 53, 54. These communication interfaces provide connectivity for the exchange of information to and from the location server 32, 33 between three different networks, which are shown as networks 60, 62, and 64. The network 60 includes a mobile switching center or centers and/or a land-based phone system switches or cell base stations. The network 62 is a network of GPS receivers designed to provide differential GPS correction information and also to provide GPS signal data including the satellite ephemeris data to the data processing unit 51. When the server 50 serves a very large geographical area or provides redundant backup to other location servers which are very remote from the server 50, a local optional GPS receiver, such as optional GPS receiver 56, may not be able to observe all GPS satellites that are in view of the other GPS receivers throughout this area. Accordingly, the network 62 collects and provides satellite ephemeris data (typically as part of the entire raw satellite navigation message) and differential GPS correction data over a wide area.

As shown in FIG. 1D, a mass storage device 55 is coupled to the data processing unit 51. Typically, the mass storage 55 will include storage for software for performing the GPS position calculations after receiving pseudoranges from the GPS enabled mobile systems, such as the mobiles systems 12a-d in FIG. 1B. These pseudoranges are normally received through the cell base station 9 and mobile switching center (not shown) and the modem or other interface 53. Alternatively, this storage 55 can be used to provide differential corrections to position calculations provided by the mobiles system 12. The mass storage device 55 also includes software, at least in one embodiment, which is used to receive and use the satellite ephemeris data (typically as part of the entire raw satellite navigation message) provided by the GPS reference network 32 through the modem or other interface 54.

In a typical embodiment of the present invention, the optional GPS receiver 56 is not necessary as the GPS reference network 62 of FIG. 1D provides differential GPS information as well as the raw satellite data messages from the satellites in view for the various reference receivers in the GPS reference network. It will be appreciated that the satellite ephemeris data obtained from the network through the modem or other interface 54 can be used in a conventional manner with the pseudoranges obtained from the mobile GPS receiver in order to compute the position information for the mobile GPS receiver. The interfaces 52, 53, and 54 can each be a modem or other suitable communication interface for coupling the data processing unit to other computer systems, as in the case of network 64, and to cellular based communication systems, as in the case of network 60, and to transmitting devices, such as computer systems in the network 62. In one embodiment, it will be appreciated that the network 62 includes a dispersed collection of GPS reference receivers dispersed over a geographical region. In some embodiments, the differential correction GPS information, obtained from a receiver 56 near the cell site or cellular service area which is communicating with the mobile GPS receiver through the cellular based communication system, will provide differential GPS correction information which is appropriate for the approximate location of the mobile GPS receiver. In other cases, differential corrections from the network 62 can be combined to compute a differential correction appropriate to the location of the mobile GPS receiver.

In the network embodiment shown in FIG. 1A the location servers, as exemplified by 32 and 33, are separate from the application servers 22 and 23, although the invention can be practiced in embodiments in which the location servers are combined with various other types of servers. It should be appreciated that the location servers themselves can consist of only software components that are resident on other processing systems attached to the wireless network. Such processing systems can perform other functions such as voice and data messaging and WWW services. In FIG. 1A, location server 33 is physically located within the same cell site as the mobile units in cell 20b. Server 32, however, is not located within any of the cells shown, but can service the data from cells 20a, 20b and 20c. In fact, even server 33 could process data from cells 20a and 20c, although server 32 may be preferred for this task due to its geographical proximity.

System Level Overview

Figure 2A:
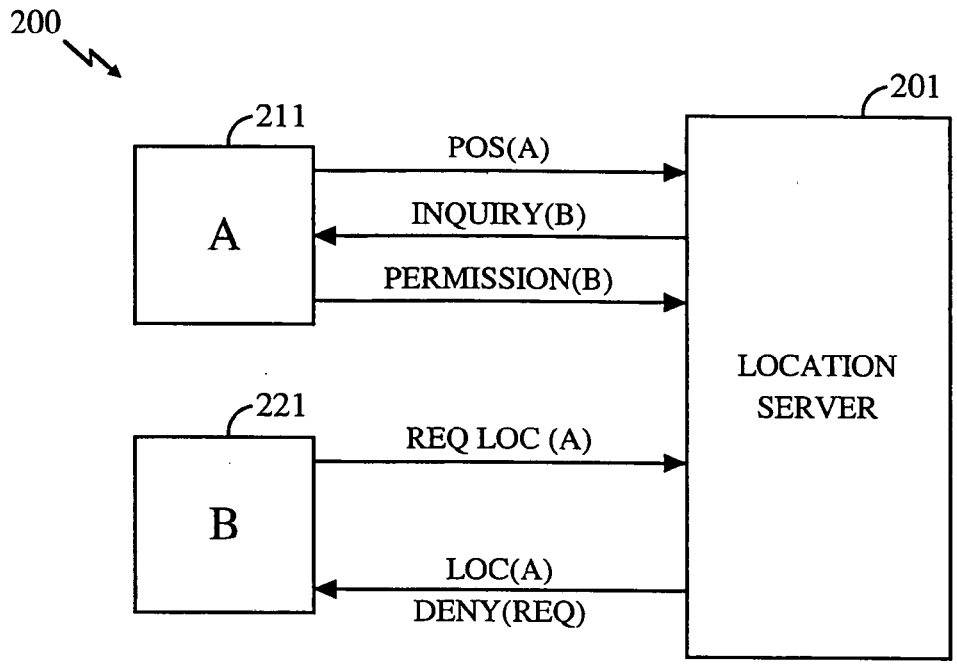
FIGS. 2A and 2B are diagrams illustrating a system-level overview of an exemplary embodiment of the invention.
Figure 2B:
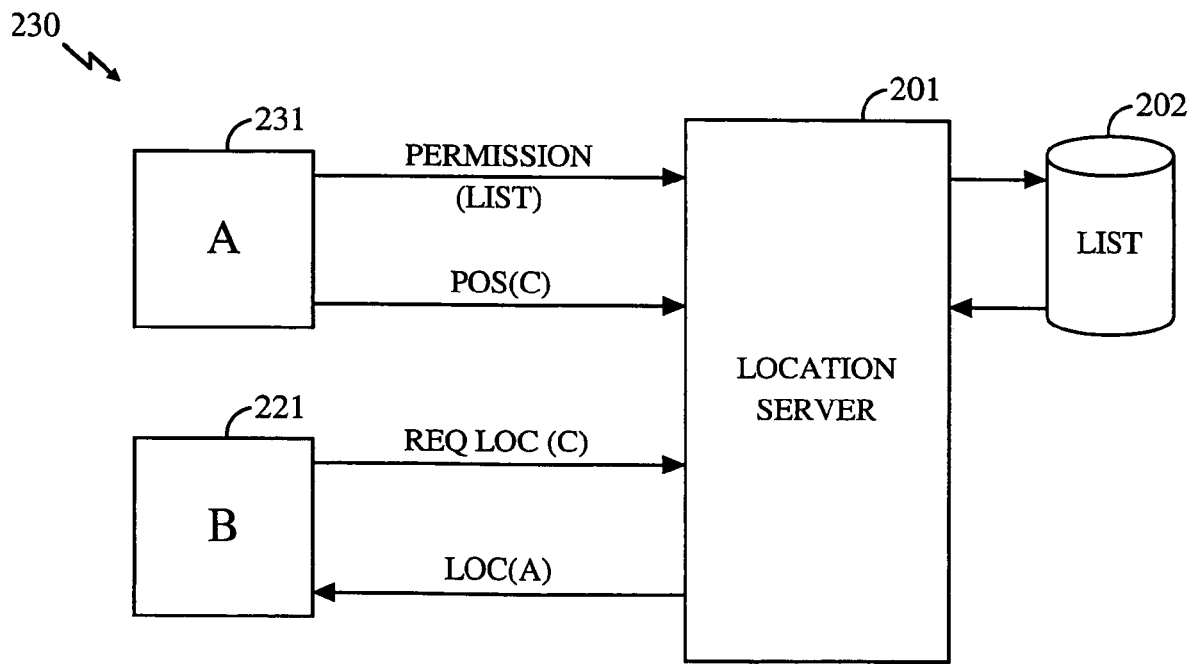

A system level overview of the operation of one system is described by reference to FIGS. 2A and 2B. Mobile systems A 211, B 221 and C 231 communicate to a location server 201 through a network such as that illustrated in FIG. 1A and described above. In FIG. 2A, mobiles A 211 and B 221 are both capable of two-way communication. In FIG. 2B, only mobile B 221 is capable of two-way communication. However, mobile A 211 can be substituted for mobile C 231 in FIG. 2C. The mobile system 75 illustrated in FIG. 1C is suitable for use as any of the mobiles A, B or C, but is not the only type of mobile that can be used. The location server 201 is assumed to be configured as described with respect to the location server 50 in FIG. 1D, although the several location servers can be so configured. One of skill in the art will also immediately appreciate that various functions of the location server described next are capable of being distributed among the other types of servers in the network.

Beginning with the embodiment illustrated in FIG. 2A, mobile A 211 sends its position information, POS(A), to the location server 201 through the network. The position information can be an actual geographic location calculated by mobile A 211 or pseudorange information, as described above. The location server 201 derives the location for mobile A 211 from the position information. If the actual location is in the position information, the location server 201 can simply extract the location. Otherwise, the location server 201 processes the position information to determine the location, as is well-known in the art.

Mobile B 221 sends a message REQLOC(A) through the network to the location server 201, requesting the location of mobile A 211. In the embodiment shown in FIG. 2A, the location server 201 determines that mobile A 211 has either not sent any permission criteria to the location server 201 (as described below), or the permission criteria that it has sent does not include mobile B 221. Therefore, location server 201 sends an inquiry message INQUIRY(B) through the network to mobile A 211 asking if mobile A 211 will permit its location to be sent to mobile B 221. Mobile A 211 responds by sending permission criteria PERMISSIONS(B) for mobile B 221. If the permissions criteria for mobile B 221 allow mobile B 211 to receive mobile A's location, then the location server 201 sends the location LOC(A) to mobile B. If the permissions criteria for mobile B 211 denies permission, or if mobile A 211 does not respond to the inquiry message, the location server 201 sends an error message DENY(REQ) or appropriate message which does not include A's location to mobile B 221.

The alternate embodiment shown in FIG. 2B, allows a mobile C 231 that is capable of only one-way communication to participate in the service provided by the invention. Mobile C 231 sends its position information POS(C) to the location server 201 which determines mobile C's location. Mobile C 231 also sends a set of permission criteria PERMISSIONS (LIST) for those mobile systems to which it wants to either allow or deny access to its location. The permission criteria is stored 202 by the location server 201. The storage medium is illustrated in FIG. 2B as a hard disk but can be any type of storage device.

If the permission criteria for mobile B 221 specifies that mobile C's location can be sent to mobile B 221 without mobile B 211 having to make a request for the location, the location server 201 immediately sends mobile C's location LOC(C) to mobile B 221. Otherwise, mobile C's location is only sent to mobile B 221 in response to a request for the location if the permission criteria for mobile B 221 permits it to receive mobile C's location.

In general, a mobile system that is requesting a location is referred to herein as a "requestor." A mobile system that receives a location without requesting it is also termed a requestor. A mobile system that is sending position information and/or permission criteria is termed an "owner" (in that it owns its location/permission criteria). It will be appreciated that a mobile system can switch between owner and requestor roles so that while mobile B 221 functions as an owner in FIGS. 2A and 2B, it can also participate in the services of the invention as an owner by sending its position information, and optionally permission criteria, to the location server 201.

The permission criteria is keyed on identifiers for requestor mobile systems, such as a telephone number or other type of unique code. An entry for a requestor mobile system in the permission criteria can contain a single field that allows or disallows access to the owner's location, or multiple fields that define time and/or geographical constraints on the requestor's access to the location. Similarly, the location request can be a single, one-time request or a request for continual updates as the location changes. Alternate embodiments of the permission criteria and location request are presented in the next section. Still other alternate embodiments will be readily apparent to one skilled in the art.

The owner's location is sent in different forms to the requestor mobile system based on the capability of the mobile system. For example, a mobile system that can only accept text information will receive the location as a latitude, longitude position pair. A mobile system capable of graphical display can also receive the location as an indicator on a map or other reference grid. An alternate embodiment that interfaces with a geographical information system (GIS) application on the requestor mobile system to display the location is also envisioned as an aspect of the invention.

Use of the service can be charged to the owner mobile system, to the requestor mobile system, or both. The change can be a flat fee or based on actual usage of the service. Alternate payment procedures are equally applicable. Additionally, any of the mobile systems can use one of the WWW servers 19 shown in FIG. 1A to connect to the location server 201 through the Internet.

The location service disclosed within permits one mobile system to learn the location of a second mobile system within limitations set by the second system. While the invention is not limited to any particular network configuration, for sake of clarity a simplified network having a single location server providing the services to mobile systems having both one-way and two-way communications with the server has been described. It will be appreciated that multiple, redundant servers may be used so that a requestor mobile may be served by any one of several possible servers.

Method Performed by Location Server and Clients

In the previous section, a system level overview of the operations of exemplary embodiments were described. In this section, the particular methods performed by the location server 201 and the mobile systems (clients) 211, 221, 231 executing the embodiments of the invention illustrated in FIGS. 2A-B are described by reference to a series of flowcharts. The methods to be performed by the clients may be implemented by computer programs made up of computer-executable instructions. Describing the methods by reference to a flowchart enables one skilled in the art to develop such programs including such instructions to carry out the methods on suitable clients (such as shown in FIG. 1C in which the processor 81 of the mobile system executes the instructions from memory 82, or comparable computer-readable media). Similarly, the methods to be performed by the server may be implemented by computer programs also made up of computer-executable instructions. Describing the methods by reference to flowcharts enables one skilled in the art to develop programs including instructions to carry out the methods on a suitable computerized server (the processor of the computer executing the instructions from computer-readable media). The methods are frequently described below as taking an action or causing a result. One of skill in the art will immediately understand that it is the execution of the instructions for the method that causes the processor to take the action or produce the result. The server methods are described with reference to FIGS. 3A and 3B; the client methods with reference to FIG. 4. Additionally, data structures for embodiments of the permission criteria, the location request message, the permission inquiry message, and the response message to the permission inquiry used by the methods are illustrated in FIGS. 5A, 5B, 5C and 5D, respectively.

Figure 3A:
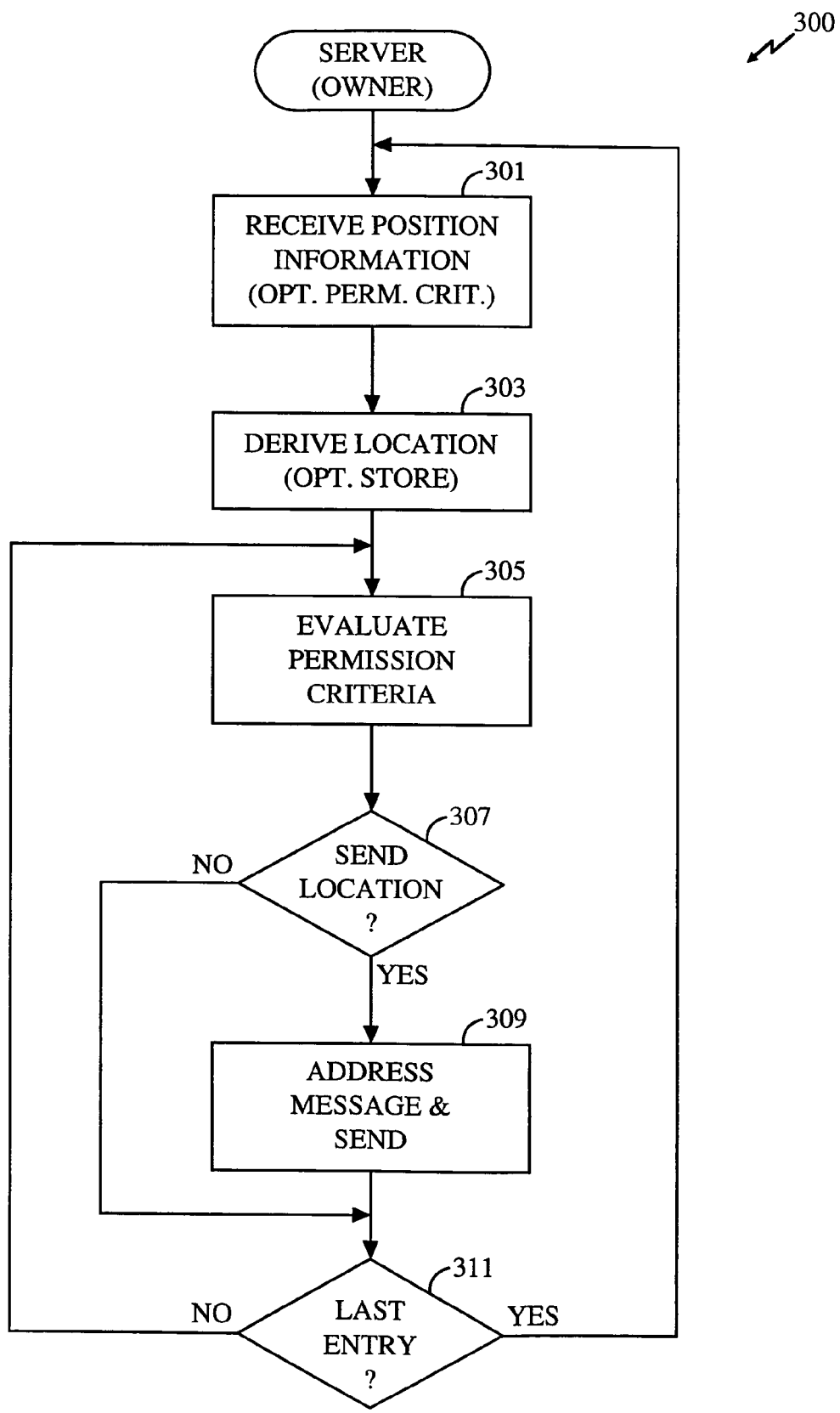
FIGS. 3A and 3B are flowcharts of methods to be performed by a server according to an exemplary embodiment of the invention.

Referring first to FIG. 3A, the acts to be performed by a computer executing the server methods 300 when communicating with a mobile system functioning as an owner are described. The server receives position information (and optionally permission criteria) from an owner mobile system (block 301). The server derives the location of the owner from the position information (block 305) and evaluates permission criteria associated with the owner mobile system (block 305). The evaluation at block 305 can include obtaining a previously stored permission criteria data structure, if any, and updating it with any new permission criteria received at block 301, or creating a new permission criteria data structure from any new permission criteria. Assuming there is a permission criteria data structure, each requestor entry is examined to determine if the requestor is to be automatically sent the location for the owner (i.e., without the requestor needing to submit a request). If so, any location access constraints, as described below, present in the entry are evaluated to determine if the location can be sent. Assuming all constraints on the automatic transmission are satisfied (block 307), a message containing the location is addressed to the corresponding requestor and placed on the network (block 309). In one embodiment, the location is only sent if the evaluation at block 305 determines that the location has changed since the location was last sent. Once each entry has been evaluated (block 311), or if there is no permission criteria data structure, the method 300 waits to receives new position information from the owner mobile system. In an alternate embodiment not shown, the server is capable of receiving the permission criteria from other sources, such as a CD-ROM, floppy disk, tape, or other computer-readable medium or from a transmission such as a transmission over a network from a remote source which stores or provides the permission criteria.

Figure 3B:
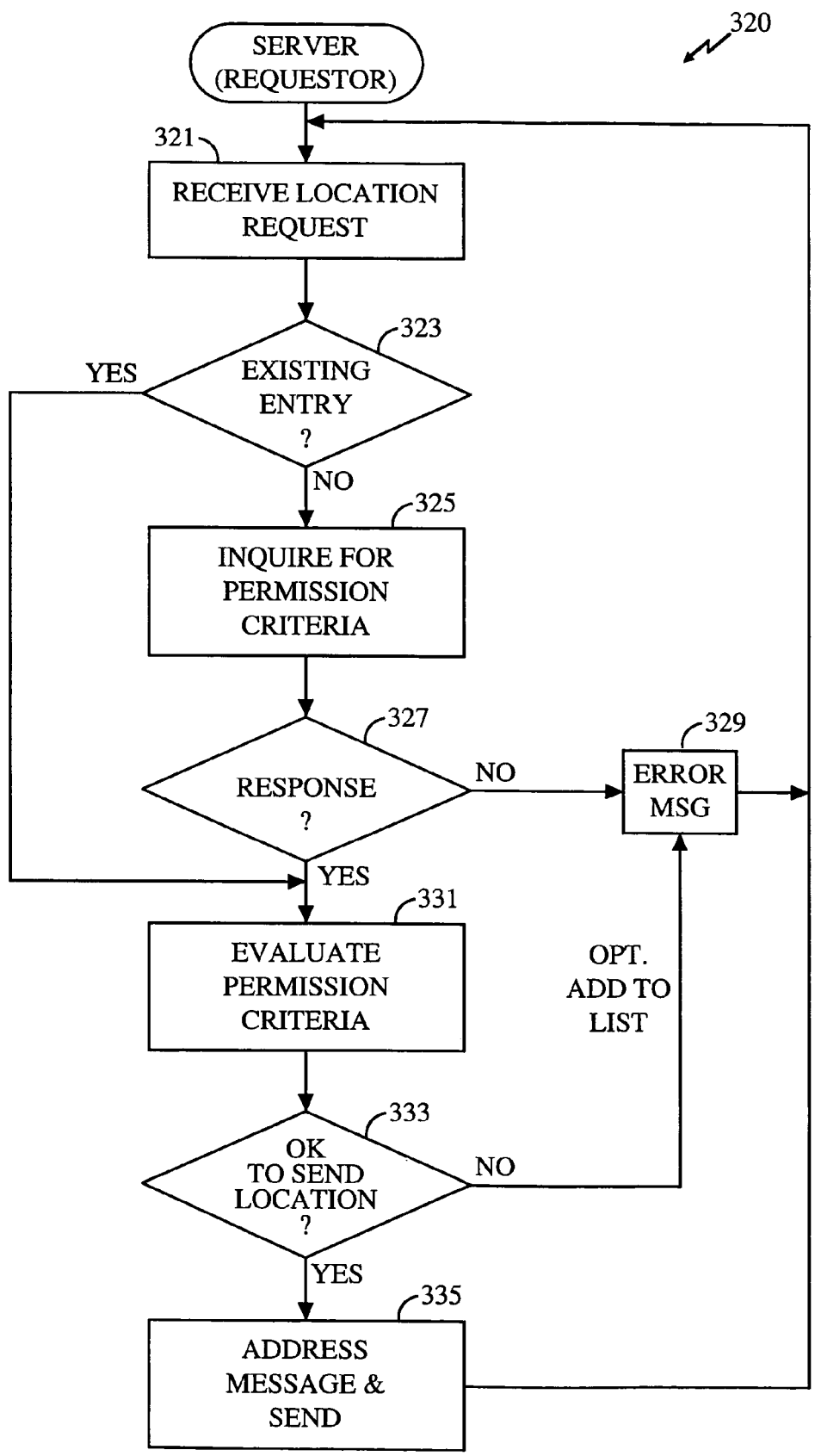

Turning now to FIG. 3B, a server method is described that is executed when communicating with a mobile system functioning as a requestor. The server receives a location request from a requestor system at block 321. The request specifies the owner system for which a location is desired and can optionally include request constraints, such as time and area, as described further below. The server searches any permission criteria associated with the owner to find an entry for the requestor (block 323). If no entry is found (and the owner is capable of and permits queries for permission criteria), the server sends an permission criteria inquiry message to the owner (block 325). A non-response from the owner (block 32&) is treated as an access denial, and the server returns an appropriate error message to the requestor (block 329).

Assuming that the server has either found an entry for the requestor or has received permission criteria for the requestor from the owner, the server evaluates the permission criteria (and any optional location request constraints) to determine whether to send the owner's location to the requestor (block 331). A positive evaluation result (block 333) causes the server to send the location (block 335), while a negative evaluation result causes the server to send an appropriate error message (block 329). The server now waits for a new request from a requestor mobile system. In an alternate embodiment, the error message is optional.

Although the processing in method 300 that determines the location of the owner from the received position information must be performed by a suitably-configured location server, the remaining functions in method 300 and all functions in method 320 are capable of being carried out by any computer having a file system capable of storing and evaluating permission criteria data structures and a communication link to a location server. Thus, any of the application servers 22-23 and WWW servers 19a-b shown in FIG. 1A are suitable systems for practicing the server methods that are not directed at calculating a location.

The client methods that are executed by the owner mobile system are described next with reference to FIG. 4. The method 400 is invoked to handle events, such as a change in location, user input, or a message from a server. If the mobile system has changed its location by a per-determined amount (block 401), the method causes the new position information to be sent to a location server (block 403). If user input is received (block 405), it is either new permission criteria or a location request (block 407). The new permission criteria is sent to an appropriate server at block 409 (i.e., to the server method 300) and the location request is sent to an appropriate server at block 411 (i.e., to the server method 320). If the method 400 is invoked because the mobile system has received a server message, it is either an inquiry for permission criteria or a response to a location request issued by the mobile system (block 413). A location request response is displayed to the user at block 415. The permission inquiry is displayed (block 417) and any user's response is evaluated to determine if a reply message need be sent to the server (block 419). If the user does not want the requestor to have access to its location, no response is necessary and the server will, after a period of time, determine that access is to be denied. However, if the user has entered permission criteria in response to the inquiry, that permission criteria is sent to the server (block 421).

Figure 4:
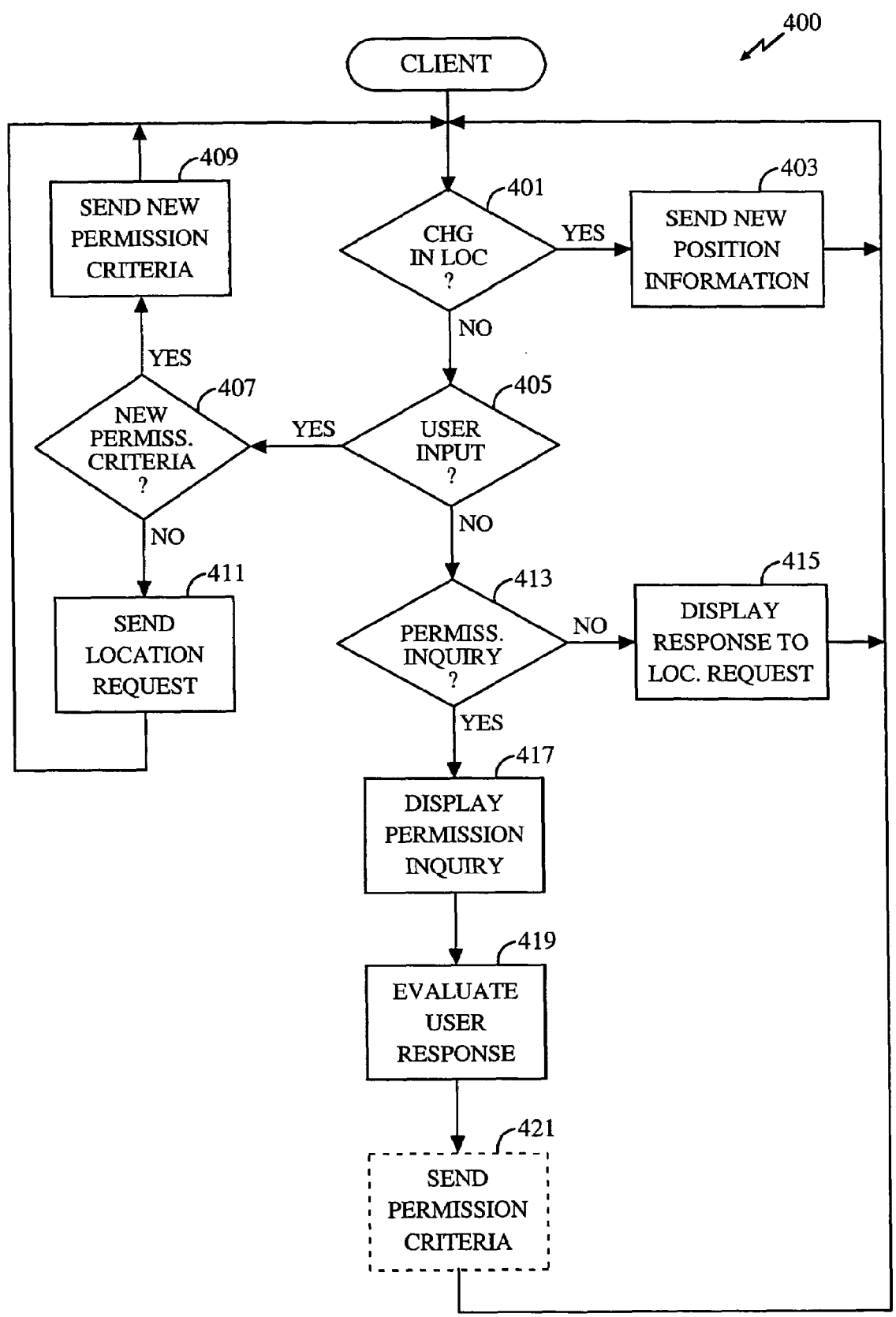
FIG. 4 is a flowchart of a method to be performed by a client according to an exemplary embodiment of the invention.

It will be appreciated that the method illustrated in FIG. 4 applies to a mobile system capable of two-way communication with the server but is readily adaptable to a mobile system with only one-way communication by deleting blocks 413-421, which are executed in response to a message from the server.

Figure 5A:
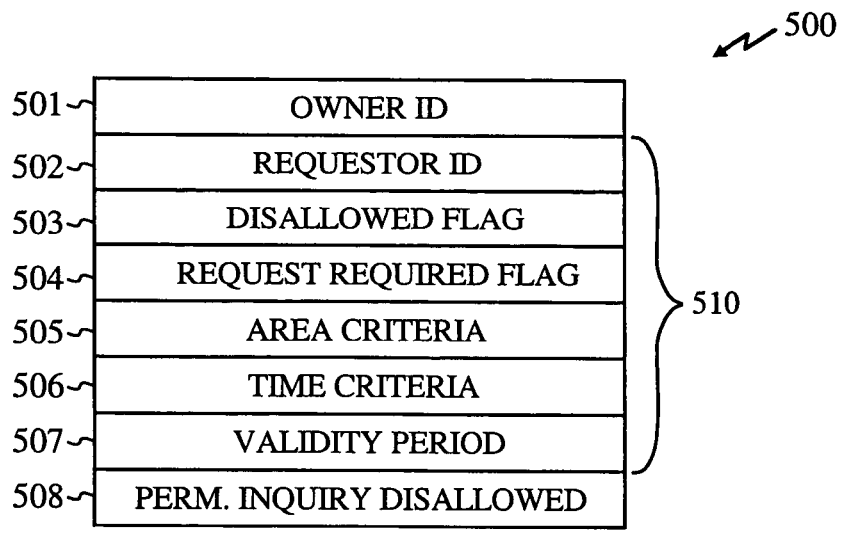
FIG. 5A is a diagram of a permissions criteria data structure suitable for use with the exemplary embodiments of the invention shown in FIGS. 2A-B.

FIG. 5A illustrates one embodiment of a permission criteria data structure suitable for use with the client and server methods discussed above. The permission criteria data structure 500 is associated with the owner through an owner identifier field 501. Each requestor entry 510 in the data structure 500 is keyed on a requestor identifier 502. If the requestor is to always to be denied access to the owner's location, a "disallowed" flag 503 is set. If the requestor is only permitted access to the owner's location in response to a request, a "request required" flag 504 is set. One of skill in the art will easily understand that an embodiment that sets the flags 503 and 504 to indicate the opposite status is equally applicable. If the owner wants its location sent, or not sent, to the requestor when the owner is in a certain geographic area, an area criteria field(s) 505 contains coordinates that define the certain area. Similarly, if the owner wants the requestor to have access, or not have access, to the owner's location during certain times, a time criteria field(s) 506 contains time information. Additionally, the owner can specify that the requestor be given access for only a limited time period as determined by a validity period field 507. The area criteria 505, time criteria 506, and validity period 507 are collectively referred to as the "location access constraints" and can be present in any combination in the permission criteria entry for a requestor. Additional location access constraints will be readily apparent to one skilled in the art.

The embodiment shown in FIG. 5A also includes an optional "permission inquiry disallowed" flag 508, which is set if the owner does not want to receive any inquiries for permission criteria. This permits a mobile system without the capability of either receiving or responding to such a inquiry to participate in the services of the invention. Such a system may be capable of only transmitting to the server, as illustrated by mobile system A 211 in FIG. 2A, or it may not interact with either a human or an automated system that can respond to the inquiry. Thus, if a location request is received by the server from a requestor that does not have an entry in the permission criteria and the flag 508 is set, the server treats the request as disallowed.

Figure 5B:
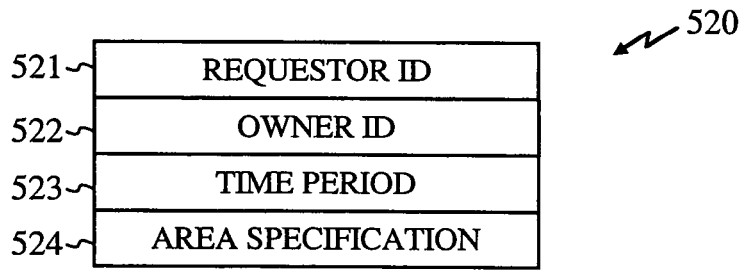
FIGS. 5B, 5C and 5D are diagrams of message data structures suitable for use with the exemplary embodiments of the invention shown in FIGS. 2A-B.
Figure 5C:
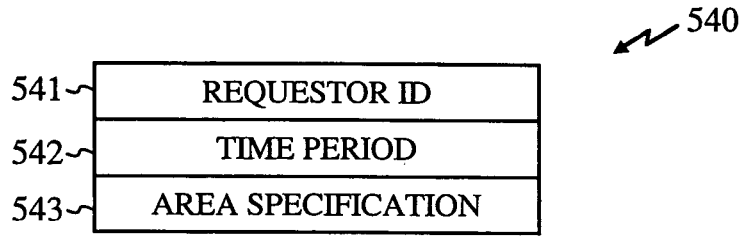

Embodiments of the messages exchanged between the mobile systems and the server are described next with reference to FIGS. 5B-C. FIG. 5B illustrates a data structure for a location request message sent from a requestor system to a server. The location request message 500 contains the requestor's identifier 521 and the identifier 522 of the owner mobile system for which the location is desired. The message 500 can optionally contain location request constraints that specify when (time period 523) the requestor wants (or does not want) to receive the location, and/or where (area specification 524) the owner mobile system must be (or not be). In one embodiment, specifying a time period 523 indicates that the server should continually update the requestor as the owner's location changes during that time period (e.g., a 24-hour watch can be specified).

Figure 5D:
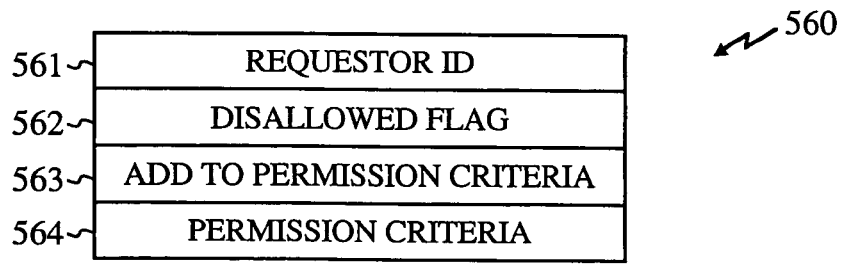

FIG. 5D is a data structure defining one embodiment of a permission criteria inquiry message 540. The message contains the requestor's identifier 541 and any optional location request constraints (time period 542 and area specification 543) specified by the requestor. Any reply to the inquiry takes the form of the data structure shown in FIG. 5D, which includes the requestor identifier 561, and either a disallowed flag 562, which prohibits all access by the requestor, an "add to permission criteria" flag 563, which results in pre-determined defaults for the permission criteria being applied to the requestor, or specific permission criteria for the requestor 564. The presence of any of the fields 562, 563, or 564 causes the server to update or create the permission criteria data structure 500 with the appropriate information for the requestor and to respond to the requestor accordingly as described above in conjunction with FIG. 3B.

CONCLUSION

A location server that provides access to the location of a mobile system within constraints specified by a user of the mobile system has been described. A mobile client that specifies permission criteria which determine these constraints is also described. Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations of the disclosed method and apparatus.

For example, those of ordinary skill within the art will appreciate that a mobile system capable of two-way communication and under the control of a suitably-programmed automated system can participate fully in the services provided by the invention without needing human intervention. Furthermore, those of ordinary skill within the art will appreciate a mobile system capable of only one-way communication can be attached to transportable items to track their location. Thus, the invention is not limited to applications requiring human interaction. Furthermore, it will be understood that the term "computer" is meant to include a broad range of possible devices which can process information. A computer may be a simple system with processing logic (e.g. an ASIC [Application Specific Integrated Circuit] or a PGA [Programmed Gate Array]) and memory to store permission criteria or it may be a complete, general purpose computer running a UNIX or Microsoft NT operating system.

The terminology used in this application with respect to a communications network is meant to include all of communications network environments capable of determining a location for a mobile system. Therefore, it is manifestly intended that this invention be limited only by the following claims and equivalents thereof.

What is claimed is:

1. A method for communicating a location of a first mobile system to a second mobile system, the method comprising:
 receiving a request for the location of the first mobile system from the second mobile system;
 obtaining, at least in part, the location of the first mobile system;
 based on a unique identifier associated with the second mobile system, obtaining permission criteria specified by the first mobile system for the second mobile system, wherein the permission criteria includes at least one associated access constraint comprising at least one of a request required constraint and/or an area constraint;
 based, at least in part, on the at least one access constraint, determining if the second mobile system is allowed to access the location of the first mobile system; and
 transmitting the location of the first mobile system to the second mobile system in response to the second mobile system being permitted to access the location of the first mobile system.

2. The method of claim 1, wherein the permission criteria is obtained from the first mobile system in response to the request from the second mobile system.

3. The method of claim 1, wherein the permission criteria is obtained from a stored list of permission criteria associated with a first user and wherein said first mobile system comprises a satellite positioning system receiver.

4. The method of claim 1, wherein in the permission criteria is selectively set by a user of the first mobile system and can be changed by the user.

5. The method of claim 1, wherein the area constraint specifies an area within which locations for the first mobile system can be transmitted to the second mobile system.

6. The method of claim 1, wherein the first mobile system comprises a position location system operatively enabled to determine position information for the first mobile system and further comprises a communication transmitter operatively enabled to transmit the position information.

7. The method of claim 6, wherein obtaining the location of the first mobile system comprises deriving the location, at least in part, from the position information transmitted by the first mobile system.

8. A communications system for locating a mobile system, the communications system comprising:
 a network;
 a first mobile system connected to the network and operatively enabled to provide position information associated with the first mobile system and a permission criteria specified by the first mobile system to the network, the permission criteria pertaining to at least a second mobile system and including a unique identifier associated with the second mobile system and at least one associated access constraint comprising at least one of a request required constraint and/or an area constraint;
 a server system connected to the network and operatively enabled to receive the position information and the permission criteria and selectively provide a location of the first mobile system derived from the position information to the network based, at least in part, on the permission criteria; and
a second mobile system connected to the network and operatively enabled to receive the location of the first mobile system from the network.

9. The communications system of claim 8, wherein the server system is operatively enabled to store the permission criteria on a storage device.

10. The communications system of claim 8, wherein the second mobile system is operatively enabled to provide a request for the location of the first mobile system to the network.

11. The communications system of claim 10, wherein the server system is operatively enabled to receive the request from the network and to evaluate the permission criteria pertaining to the second mobile system.

12. The communications system of claim 10, wherein the server system is operatively enabled to provide an error message to the network in response to the permission criteria permitting the location of the first mobile system to be provided to the second mobile system, and wherein the second mobile system is operatively enabled to receive the error message from the network.

13. A mobile communications system comprising:
memory operatively enabled to store computer implementable instructions;
a communication transceiver operatively enabled to exchange signals with a network; and
a processor coupled to the memory and the communication transceiver and operatively enabled, at least in part by implementing the computer implementable instructions, to:
provide position information associated with the mobile communications system to the network through the communication transceiver,
provide a permission criteria pertaining to another mobile communications system to the network through the communication transceiver, the permission criteria including a unique identifier of said another mobile communications system and at least one associated access constraint comprising at least one of a request required constraint and/or an area constraint, wherein the at least one access constraint defines when said another mobile communications system is allowed to access the location of the mobile communications system.

14. The mobile communications system of claim 13, wherein the processor is operatively enabled to receive a query for the permission criteria pertaining to said another mobile communications system from the network through the communication transceiver.

15. A server system comprising:
memory operatively enabled to store computer implementable instructions;
a communication transceiver operatively enabled to exchange signals with a network; and
a processor coupled to the memory and the communication transceiver and operatively enabled, at least in part by implementing the computer implementable instructions, to:
receive position information associated with a first mobile system and a permission criteria specified by the first mobile system for a second mobile system from the network through the communication transceiver, wherein, the permission criteria is associated with a unique identifier of the second mobile system and includes at least one associated access constraint comprising at least one of a request required constraint and/or an area constraint, wherein the at least one associated access constraint defines when the second mobile systems is allowed to access the location of the first mobile system, and
in response to a request for the location of the first mobile system from the second mobile system as received from the network through the communication transceiver, determine the location of the first mobile system based, at least in part, on the position information, and selectively send the location of the first mobile system to the network through the communication transceiver in response to said permission criteria being satisfied.

16. The server system of claim 15, wherein the processor is operatively enabled, at least in part by implementing the computer implementable instructions, to store the permission criteria in the memory.

17. The server system of claim 15, wherein the processor is operatively enabled, at least in part by implementing the computer implementable instructions to send a request for the permission criteria to the network through the communication transceiver.

18. An article comprising a computer-readable medium having stored thereon computer-executable instructions which if implemented by a server system operatively enable the server system to:
receive position information from a mobile communications system; and
send to a different mobile communications system, a location derived from the position information in accordance with a permission criteria specified by the mobile communications system for the different mobile communications system, the permission criteria including at least one unique identifier that identifies said different mobile communications system and at least one associated access constraint comprising at least one of a request required constraint and/or an area constraint.

19. The article of claim 18, wherein the computer-executable instructions, if implemented by a server system, operatively enable the server system to:
receive the permission criteria from the mobile communications system.

20. The article of claim 18, wherein the computer-executable instructions, if implemented by a server system, operatively enable the server system to:
receive a request for the location from the different mobile communications system.

21. The article of claim 18, wherein the computer-executable instructions, if implemented by a server system, operatively enable the server system to:
send a query for the permission criteria to the mobile communications system.

22. A data storage device comprising:
a computer-readable medium having stored thereon a permissions criteria data structure comprising:
an owner identifier field in which data representing an identifier for a first mobile communications system is stored; and
a requester entry in which data representing an identifier for a second mobile communications system and corresponding data determinative of whether permissions are granted to the second mobile communications system by the first mobile communications system are stored, wherein the corresponding data specifies at least one access constraint comprising at least one of a request required constraint and/or an area constraint.

23. An apparatus comprising:
means for receiving a request for a location of a first mobile system from a second mobile system;
means for obtaining, at least in part, the location of the first mobile system;
means for obtaining permission criteria specified by the first mobile system for the second mobile system, wherein the permission criteria includes at least one associated access constraint comprising at least one of a request required constraint and/or an area constraint;
means for determining if the second mobile system is allowed to access the location of the first mobile system based, at least in part, on the at least one access constraint; and
means for transmitting the location of the first mobile system to the second mobile system in response to the second mobile system being permitted to access the location of the first mobile system.

24. The apparatus of claim 23, wherein the means for obtaining permission criteria obtains the permission criteria from the first mobile system in response to the request from the second mobile system.

25. The apparatus of claim 23, wherein the means for obtaining permission criteria obtains the permission criteria from a stored list of permission criteria associated with a first user and wherein said first mobile system comprises means for receiving signals from a satellite positioning system.

26. The apparatus of claim 23, wherein the means for obtaining permission criteria obtains the permission criteria as selectively set by a user of the first mobile system.

27. The apparatus of claim 23, wherein the area constraint specifies an area within which locations for the first mobile system can be transmitted to the second mobile system.

28. The apparatus of claim 23, wherein the first mobile system comprises means for determining position information for the first mobile system and means for transmitting the position information.

29. The method of claim 28, wherein the means for determining position information comprises means for deriving the location, at least in part, from the position information transmitted by the first mobile system.

* * * * *